US009022452B2

United States Patent
Krajenke et al.

(10) Patent No.: US 9,022,452 B2
(45) Date of Patent: May 5, 2015

(54) VEHICLE AND A HINGE ASSEMBLY FOR A STORAGE COMPARTMENT OF THE VEHICLE

(71) Applicant: GM Global Technology Operations LLC, Detriot, MI (US)

(72) Inventors: Gary W. Krajenke, Warren, MI (US); Graham S. Foulkes, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/892,382

(22) Filed: May 13, 2013

(65) Prior Publication Data

US 2014/0333087 A1    Nov. 13, 2014

(51) Int. Cl.

| | |
|---|---|
| *B62D 25/12* | (2006.01) |
| *F16F 7/08* | (2006.01) |
| *E05D 5/06* | (2006.01) |
| *E05D 11/06* | (2006.01) |
| *E05F 1/10* | (2006.01) |
| *E05F 3/16* | (2006.01) |
| *E05F 5/06* | (2006.01) |

(52) U.S. Cl.
CPC . *B62D 25/12* (2013.01); *F16F 7/08* (2013.01); *E05D 5/062* (2013.01); *E05D 11/06* (2013.01); *E05F 1/1058* (2013.01); *E05F 1/1075* (2013.01); *E05F 3/16* (2013.01); *E05F 5/06* (2013.01); *E05D 2005/067* (2013.01); *E05Y 2201/21* (2013.01); *E05Y 2201/26* (2013.01); *E05Y 2900/548* (2013.01)

(58) Field of Classification Search
CPC ...... B62D 25/10; B62D 25/105; B62D 25/12; B62D 25/087; E05Y 2900/548
USPC ...................... 296/76, 207; 16/82, 86 A, 86 R
See application file for complete search history.

(56) References Cited

U.S. PATENT DOCUMENTS

| | | | | |
|---|---|---|---|---|
| 1,089,193 | A * | 3/1914 | Ervien | 292/15 |
| 4,192,039 | A * | 3/1980 | Haberle et al. | 16/86 B |
| 4,261,612 | A * | 4/1981 | Chrysler et al. | 296/146.8 |
| 4,932,100 | A * | 6/1990 | Flowers et al. | 16/82 |
| 5,152,030 | A * | 10/1992 | Cogo | 16/86 C |
| 5,193,961 | A * | 3/1993 | Hoyle et al. | 411/553 |
| 5,358,301 | A * | 10/1994 | Konchan et al. | 296/146.1 |
| 5,421,124 | A * | 6/1995 | Zuccaro | 49/381 |

(Continued)

FOREIGN PATENT DOCUMENTS

DE     102009051629 A1    7/2010

*Primary Examiner* — H Gutman
(74) *Attorney, Agent, or Firm* — Quinn Law Group, PLLC (57) ABSTRACT

A hinge assembly for a storage compartment includes a first component and a second component coupled to the first component. The second component is movable between a first position and a second position relative to the first component. A damper device includes a housing assembly supported by the first component and a finger attached to the second component such that the finger is movable with the second component between the first and second positions. The finger and the housing assembly are spaced from each other when the second component is in the first position, and the finger slidingly engages the housing assembly as the second component moves to the second position such that frictional engagement between the finger and the housing assembly dampens movement of the second component relative to the first component.

46 Claims, 4 Drawing Sheets

(56) References Cited

U.S. PATENT DOCUMENTS

| | | | |
|---|---|---|---|
| 5,802,671 A * | 9/1998 | Ikuma | 16/85 |
| 5,937,585 A * | 8/1999 | Tidbury et al. | 49/504 |
| 5,992,927 A * | 11/1999 | Scroggie | 296/207 |
| 6,039,388 A * | 3/2000 | Choi | 296/207 |
| 6,039,389 A * | 3/2000 | Monette et al. | 296/207 |
| 6,206,455 B1 * | 3/2001 | Faubert et al. | 296/155 |
| 6,247,744 B1 * | 6/2001 | Townsend et al. | 296/146.11 |
| 6,318,795 B1 * | 11/2001 | Pyo | 296/207 |
| 6,676,201 B2 * | 1/2004 | Im et al. | 296/207 |
| 7,014,258 B2 * | 3/2006 | Schubring et al. | 296/207 |
| 7,308,731 B2 * | 12/2007 | Schubring et al. | 16/86 R |
| 7,686,353 B2 * | 3/2010 | Lewis et al. | 292/19 |
| 8,118,332 B2 * | 2/2012 | Morgan et al. | 292/17 |
| 8,235,453 B2 * | 8/2012 | Hull, Jr. | 296/155 |
| 8,322,762 B2 * | 12/2012 | Watson | 292/343 |
| 2010/0109371 A1 | 5/2010 | Shoemaker et al. | |

* cited by examiner

VEHICLE AND A HINGE ASSEMBLY FOR A STORAGE COMPARTMENT OF THE VEHICLE

TECHNICAL FIELD

The present disclosure relates to a vehicle and a hinge assembly for a storage compartment of the vehicle.

BACKGROUND

Various vehicles include a trunk for storing items. Generally, a trunk lid opens and closes on a hinge, with a spring counterbalancing the mass of the trunk lid. Sometimes, the force required to raise the trunk lid, in combination with a spring force applied to the trunk lid by the spring, causes the trunk lid to open quickly such that the trunk lid bobbles back and forth adjacent to the end of travel before coming to rest in an open position. In other words, when the trunk lid reaches the end of the travel when opening, the trunk lid or a portion of the hinge can hit a stop and bounce off of the stop and then move back toward the stop, and so on, until the trunk lid comes to rest in the open position.

SUMMARY

The present disclosure provides a hinge assembly for a storage compartment of a vehicle. The hinge assembly includes a first component and a second component coupled to the first component. The second component is movable between a first position and a second position relative to the first component. The hinge assembly further includes a damper device. The damper device includes a housing assembly supported by the first component and a finger attached to the second component such that the finger is movable with the second component between the first and second positions. The finger and the housing assembly are spaced from each other when the second component is in the first position, and the finger slidingly engages the housing assembly as the second component moves to the second position such that frictional engagement between the finger and the housing assembly dampens movement of the second component relative to the first component.

The present disclosure also provides a vehicle including a storage compartment. The storage compartment includes a mounting shelf and a trunk lid movable relative to the mounting shelf to open and close the storage compartment. The vehicle also includes a hinge assembly coupled to the mounting shelf and the trunk lid for supporting the trunk lid when opening and closing the storage compartment. The hinge assembly includes a first component attached to the mounting shelf. The hinge assembly also includes a second component coupled to the first component and attached to the trunk lid. The second component is movable between a first position and a second position relative to the first component. The vehicle further includes a damper device. The damper device includes a housing assembly supported by the first component and a finger attached to the second component such that the finger is movable with the second component between the first and second positions. The finger and the housing assembly are spaced from each other when the second component is in the first position, and the finger slidingly engages the housing assembly as the second component moves to the second position such that frictional engagement between the finger and the housing assembly dampens movement of the trunk lid relative to the mounting shelf.

Therefore, the hinge assembly, and more specifically, the damper device controls the opening of the trunk lid to prevent bobbling of the trunk lid when the trunk lid reaches the end of travel to come to rest open. For example, the damper device slows down the opening of the trunk lid to prevent the trunk lid from opening so quickly that the trunk lid bobbles back and forth when the trunk lid reaches the end of travel. As such, the hinge assembly provides a more controlled opening of the trunk lid. Furthermore, the hinge assembly is durable and cost effective.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
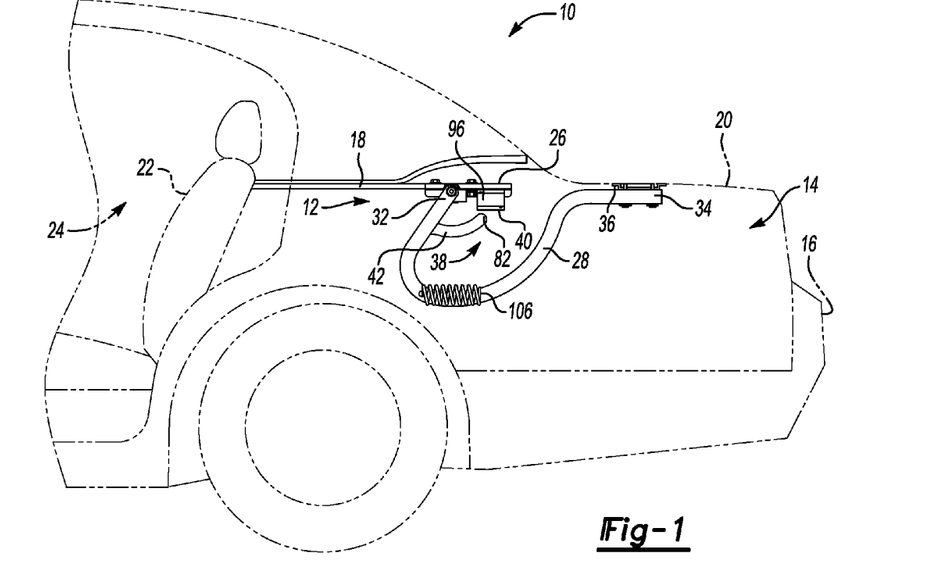
FIG. 1 is a schematic broken partially phantom side view of a vehicle illustrating a hinge assembly inside a storage compartment, with the storage compartment closed and a second component in a first position.
Figure 2:
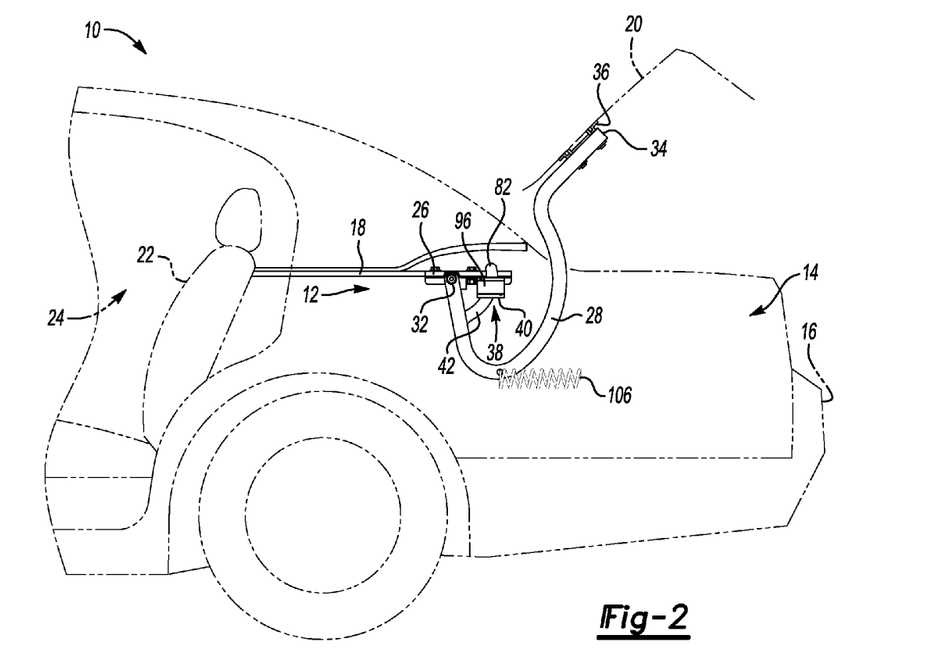
FIG. 2 is a schematic broken partially phantom side view of the vehicle illustrating the trunk lid up to open the storage compartment and the second component in a second position.

Referring to the Figures, wherein like numerals indicate like or corresponding parts throughout the several views, a vehicle 10 and a hinge assembly 12 for a storage compartment 14 of the vehicle 10 are generally shown in FIGS. 1 and 2. Generally, the vehicle 10 includes the hinge assembly 12. The hinge assembly 12 can be useful for vehicles 10, such as automotive vehicles. It is to be appreciated that the hinge assembly 12 can also be useful for non-automotive applications including, for example, marine or aviation applications, etc.

As shown in FIGS. 1 and 2, the vehicle 10 can include the storage compartment 14. For example, a user can store objects, items, etc. in the storage compartment 14. Generally, in one vehicle application, the storage compartment 14 is disposed toward a rear 16 of the vehicle 10. It is to be appreciated that the storage compartment 14 can be located at the front of the vehicle 10 or any other suitable location. Furthermore, it is to be appreciated that the hinge assembly 12 can be utilized for a hood of the vehicle 10 or any other suitable features of the vehicle 10.

Continuing with FIGS. 1 and 2, the storage compartment 14 can include a mounting shelf 18 and a trunk lid 20 movable relative to the mounting shelf 18 to open and close the storage compartment 14. For example, the mounting shelf 18 can be disposed behind the rear passenger seats 22 as shown in FIGS.

1 and 2. As such, the mounting shelf 18 cooperates with a passenger compartment 24 of the vehicle 10 and the storage compartment 14. The mounting shelf 18 can also be referred to as a packaging shelf. It is to be appreciated that the storage compartment 14 can include other features such as side walls cooperating with the mounting shelf 18 and the trunk lid 20 to further define the storage compartment 14.

Generally, the hinge assembly 12 is disposed inside the storage compartment 14. Therefore, when the storage compartment 14 is closed, the hinge assembly 12 is not visible from the outside of the vehicle 10. The hinge assembly 12 is coupled to the mounting shelf 18 and the trunk lid 20 for supporting the trunk lid 20 when opening and closing the storage compartment 14. Simply stated, the hinge assembly 12 is utilized to move the trunk lid 20 back and forth to open and close the storage compartment 14. For example, in one embodiment, the trunk lid 20 rotates to open and close the storage compartment 14. FIG. 1 illustrates the trunk lid 20 down such that the storage compartment 14 is closed and FIG. 2 illustrates the trunk lid 20 up such that the storage compartment 14 is opened.

As best shown in FIGS. 1 and 2, a part of the hinge assembly 12 is attached to the mounting shelf 18 and another part of the hinge assembly 12 is attached to the trunk lid 20 as further discussed below. It is to be appreciated that a plurality of hinge assemblies 12 can be utilized in the vehicle 10. For example, one hinge assembly 12 can be attached adjacent to one side edge of the trunk lid 20 and the mounting shelf 18, and similarly, another hinge assembly 12 can be attached adjacent to another side edge of the trunk lid 20 and the mounting shelf 18.

Figure 3:
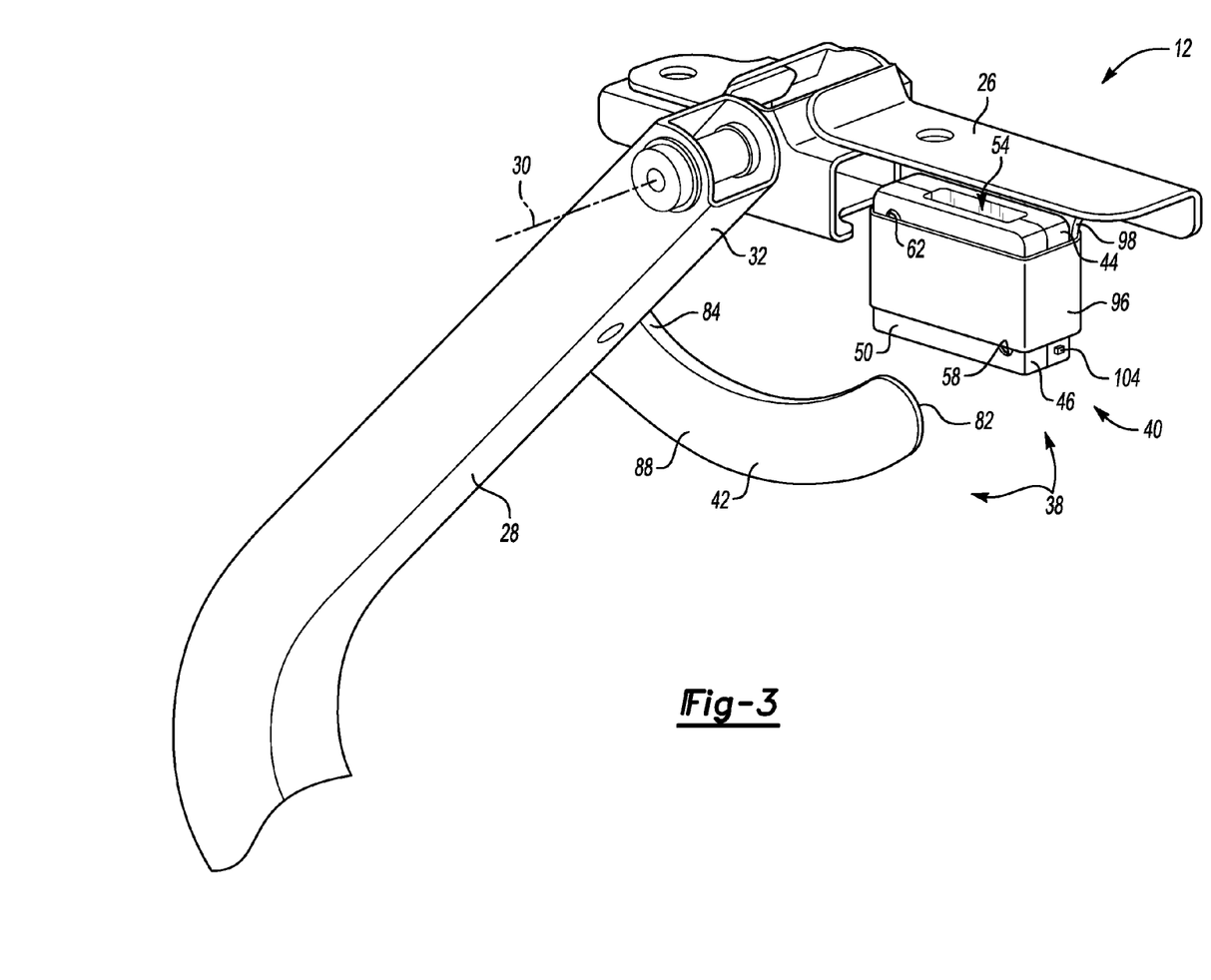
FIG. 3 is a schematic broken perspective view of the hinge assembly.

Also referring to FIG. 3, the hinge assembly 12 includes a first component 26 and a second component 28 coupled to the first component 26. More specifically, in certain embodiments, the first component 26 is attached to the mounting shelf 18 (the first component 26 can be one part of the hinge assembly 12 as mentioned above) and the second component 28 is attached to the trunk lid 20 (the second component 28 can be another part of the hinge assembly 12 as mentioned above). Therefore, the first component 26 is coupled or attached to the mounting shelf 18 such that the first component 26 is not visible from inside of the passenger compartment 24. Similarly, the second component 28 is coupled or attached to the trunk lid 20 such that the second component 28 is not visible from outside of the vehicle 10 when the storage compartment 14 is closed.

Generally, the second component 28 is movably coupled to the first component 26. Specifically, the second component 28 is movable between a first position and a second position relative to the first component 26. In certain embodiments, as best shown in FIG. 3, the second component 28 can be rotatable about a pivot axis 30 between the first and second positions. As such, the second component 28 is coupled to the first component 26 at the pivot axis 30, with the second component 28 rotatable between the first and second positions relative to the first component 26. FIG. 1 illustrates the second component 28 in the first position and FIG. 2 illustrates the second component 28 in the second position. The first component 26 can be further defined as a mounting bracket, with the mounting bracket attached to the mounting shelf 18. The second component 28 can be further defined as a rod. Additionally, the second component 28 can be referred to as a goose neck strap.

Referring to FIGS. 1-3, the second component 28 can include a first end portion 32 coupled to the first component 26. Additionally, the second component 28 can include a second end portion 34 spaced from the first end portion 32, with the second end portion 34 attached to the trunk lid 20. For example, the second end portion 34 is attached to an inside 36 of the trunk lid 20 as shown in FIGS. 1 and 2.

The hinge assembly 12 further includes a damper device 38 as best shown in FIGS. 1-4. The damper device 38 includes a housing assembly 40 supported by the first component 26 and a finger 42 attached to the second component 28 such that the finger 42 is movable with the second component 28 between the first and second positions. Therefore, the finger 42 is shown in the first position in FIG. 1 and the finger 42 is shown in the second position in FIG. 2. As such, the finger 42 and the housing assembly 40 can be spaced from each other when the second component 28 is in the first position (see FIG. 1), and the finger 42 slidingly engages the housing assembly 40 as the second component 28 moves to the second position such that frictional engagement between the finger 42 and the housing assembly 40 dampens movement of the second component 28 relative to the first component 26. More specifically, the finger 42 slidingly engages the housing assembly 40 as the second component 28 moves to the second position such that frictional engagement between the finger 42 and the housing assembly 40 dampens movement of the trunk lid 20 relative to the mounting shelf 18. For example, as shown in FIG. 2, the finger 42 is inserted through the housing when the second component 28 is in the second position which will be discussed further below. Generally, the finger 42 is attached to the second component 28 adjacent to or proximal to the first end portion 32. It is to be appreciated that the finger 42 can be attached to the second component 28 by any suitable methods, such as fasteners, welding, adhesive, etc. It is to further be appreciated that the finger 42 can be attached to the second component 28 such that the finger 42 floats on one or more pins or bolts to compensate for tolerance differences. It is to also be appreciated that the finger 42 can be attached to the second component 28 in any suitable location. In addition, it is to be appreciated that a plurality of damper devices 38 can be utilized.

The finger 42 can be formed of any suitable material(s). For example, the finger 42 can be formed of a metal material, a polymeric material, etc. In addition, one or more coatings can be applied to the finger 42 as desired to assist in creating friction between the finger 42 and the housing assembly 40 when the second component 28 moves to the second position to dampen movement of the trunk lid 20 relative to the mounting shelf 18.

Figure 4:
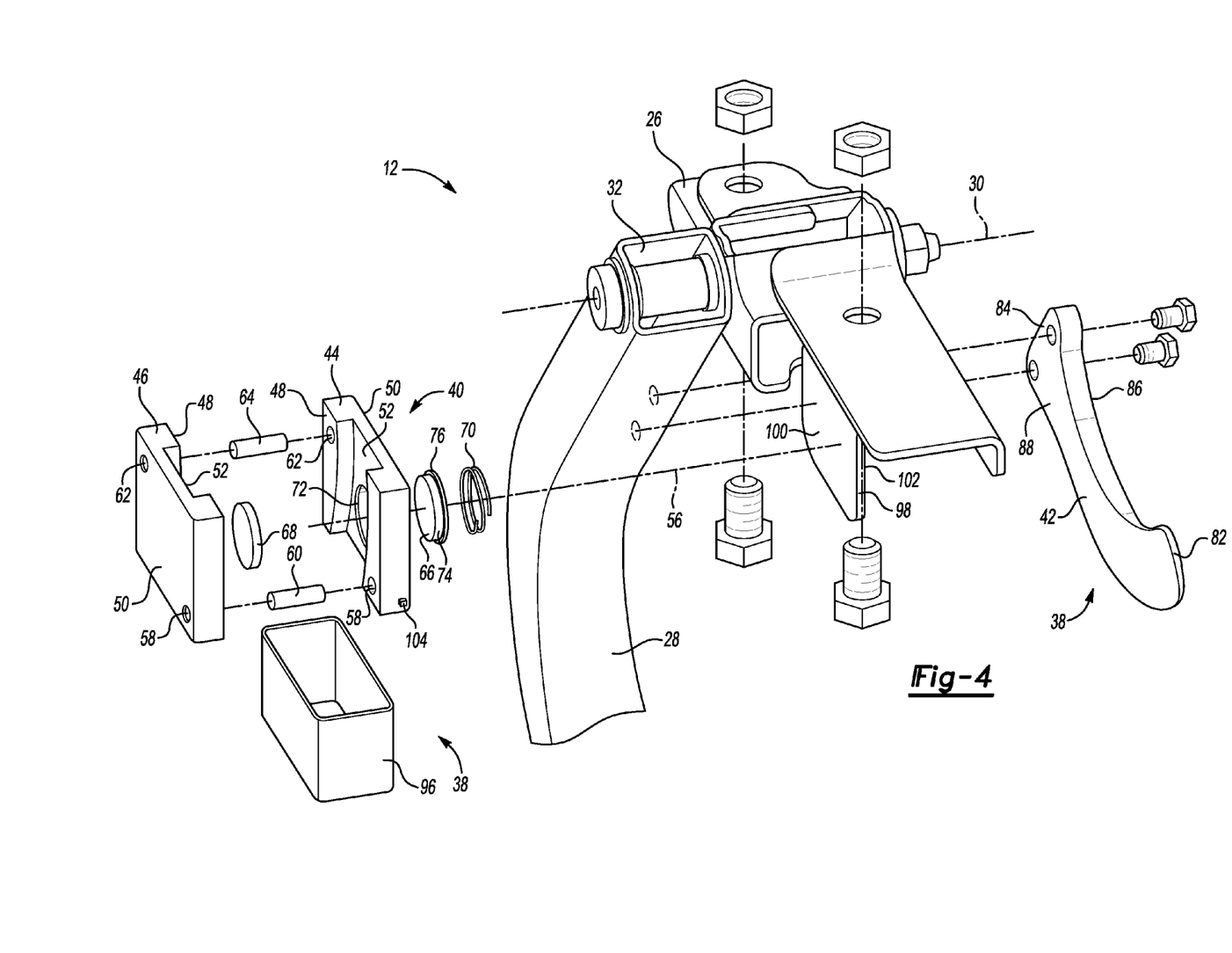
FIG. 4 is a schematic partially exploded perspective view of the hinge assembly.
Figures 5, 6:
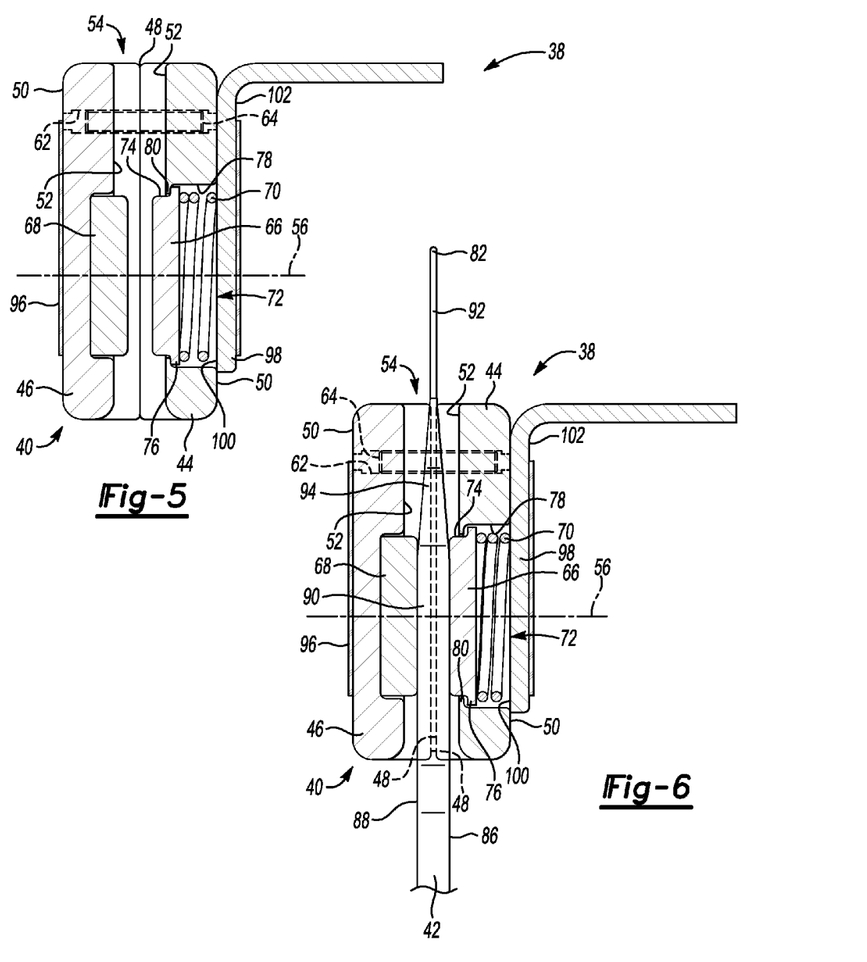
FIG. 5 is a schematic cross-sectional view of a housing assembly of the hinge assembly, with a first shoe biased into engagement with a first segment of the housing assembly.
FIG. 6 is a schematic cross-sectional view of the housing assembly with a finger disposed in a pocket of the housing assembly, with the finger engaging the first shoe and a second shoe.

As best shown in FIGS. 3-5, the housing assembly 40 can include a first segment 44 and a second segment 46 cooperating with each other. Each of the first and second segments 44, 46 have an inner side 48 facing each other and an outer side 50 opposing the inner side 48 of the respective first and second segments 44, 46. In other words, the inner and outer sides 48, 50 of the first segment 44 oppose each other and the inner and outer sides 48, 50 of the second segment 46 oppose each other. As such, the inner side 48 of the first segment faces the inner side 48 of the second segment 46. The inner side 48 of each of the first and second segments 44, 46 define a groove 52 cooperating with each other to present a pocket 54 for receiving the finger 42. Therefore, as the second component 28 moves to the second position, the finger 42 is inserted through the pocket 54 of the first and second segments 44, 46. FIG. 6 illustrates the finger 42 inserted through the pocket 54 when the second component 28 is in the second position. It is to be appreciated that the housing assembly 40 can be disposed back under the first component 26 such that the pocket 54 overlaps the first component 26, and in this configuration, the first component 26 defines a slot aligning with the pocket 54 for allowing the finger 42 to move through the slot when the second component 28 is in the second position.

Generally, in certain embodiments, at least one of the first and second segments 44, 46 are affixed to the first component 26. In one embodiment, as best shown in FIGS. 5 and 6, the first segment 44 is affixed to the first component 26 and the second segment 46 is movable relative to the first segment 44 along to a first axis 56 (see FIGS. 5 and 6). In another embodiment, the first segment 44 is movable relative to the second segment 46 along the first axis 56 and the second segment 46 is affixed to the first component 26. In yet another embodiment, the first and second segments 44, 46 are each affixed to the first component 26. In yet another embodiment, the first and second segments 44, 46 are both movable relative to each other, i.e., neither segments 44, 46 are affixed to the first component 26. It is to be appreciated that when utilizing one of the affixed embodiments, the first and/or second segments 44, 46 can be affixed to the first component 26 by any suitable methods, such as welding, adhesive, fasteners, etc.

Turning back to FIGS. 3 and 4, the first and second segments 44, 46 can each define a first aperture 58 generally aligning with each other. The housing assembly 40 can further include a first guide 60 disposed in the first aperture 58 of the first and second segments 44, 46 for maintaining alignment of the first and second segments 44, 46. For example, the first guide 60 can maintain alignment of the first and second segments 44, 46 as the second segment 46 moves relative to the first segment 44 in response to movement of the finger 42 into and out of the pocket 54. As other examples, the first guide 60 can maintain alignment of the first and second segments 44, 46 as the first segment 44 moves relative to the second segment 46 or when the first and second segments 44, 46 move relative to each other.

Additionally, the first and second segments 44, 46 can each define a second aperture 62 generally aligning with each other and spaced from the first aperture 58 of the first and second segments 44, 46. Furthermore, the housing assembly 40 can further include a second guide 64 disposed in the second aperture 62 of the first and second segments 44, 46 for maintaining alignment of the first and second segments 44, 46. For example, the second guide 64 can maintain alignment of the first and second segments 44, 46 as the second segment 46 moves relative to the first segment 44 in response to movement of the finger 42 into and out of the pocket 54. Therefore, for example, as the second segment 46 moves toward or away from the first segment 44, the second segment 46 slides along the first and second guides 60, 64 such that the orientation of the second segment 46 is maintained along the first axis 56. As other examples, the second guide 64 can maintain alignment of the first and second segments 44, 46 as the first segment 44 moves relative to the second segment 46 or when the first and second segments 44, 46 move relative to each other. Furthermore, the first and second apertures 58, 62 of the first and second segments 44, 46 are each spaced from the groove 52 of the first and second segments 44, 46. Therefore, the first and second guides 60, 64 are spaced from the pocket 54 such that the guides 60, 64 do not interfere with the finger 42 moving through the pocket 54.

Turning to FIGS. 4-6, the housing assembly 40 can also include a first shoe 66 coupled to one of the first and second segments 44, 46 of the housing assembly 40. The first shoe 66 is at least partially disposed in the pocket 54 such that the finger 42 slidingly engages the first shoe 66 as the finger 42 moves through the pocket 54 when the second component 28 moves to the second position. Therefore, the finger 42 slidingly engaging the housing assembly 40 can be further defined as the finger 42 slidingly engaging the first shoe 66.

Continuing with FIGS. 4-6, in certain embodiments, the housing assembly 40 can further include a second shoe 68 coupled to one of the first and second segments 44, 46 of the housing assembly 40. The first and second shoes 66, 68 are spaced from and generally align with each other along the first axis 56. The finger 42 slidingly engages the first and second shoes 66, 68 when the second component 28 moves to the second position. In other words, the finger 42 is disposed between the first and second shoes 66, 68 when the second component 28 moves to the second position. The finger 42 slidingly engaging the housing assembly 40 can be further defined as the finger 42 slidingly engaging the first and second shoes 66, 68. It is to be appreciated that the face of the shoes 66, 68 that selectively engages the finger 42 can be any suitable configuration, such as flat (as shown in the figures), arcuate, curved or arced, etc.

The first and second shoes 66, 68 can be formed of a frictional material. For example, the frictional material can be a polymeric material. One suitable polymeric material is plastic. The first and second shoes 66, 68 can be any suitable frictional material(s) for creating friction between the shoes 66, 68 and the finger 42 when the second component 28 moves to the second position to dampen movement of the trunk lid 20 as the trunk lid 20 opens. In addition, one or more coatings can be applied to the first and second shoes 66, 68 as desired to assist in creating friction between the finger 42 and the shoes 66, 68 when the second component 28 moves to the second position.

Generally, in certain embodiments, at least one of the first and second shoes 66, 68 are affixed to one of the first and second segments 44, 46 of the housing assembly 40. In one embodiment, as best shown in FIGS. 5 and 6, the first shoe 66 is movably coupled to the first segment 44 and the second shoe 68 is affixed to the second segment 46. In another embodiment, the first shoe 66 is affixed to the first segment 44 and the second shoe 68 is movably coupled to the second segment 46. In yet another embodiment, the first shoe 66 is affixed to the first segment 44 and the second shoe 68 is affixed to the second segment 46. In yet another embodiment, the first shoe 66 is movably coupled to the first segment 44 and the second shoe 68 is movably coupled to the second segment 46, i.e., neither shoes 66, 68 are affixed to respective segments 44, 46. It is to be appreciated that when utilizing one of the affixed embodiments, the first and/or second shoes 66, 68 can be affixed to respective segments 44, 46 by any suitable methods, such as welding, adhesive, fasteners, etc.

Turning to FIGS. 4-6, the housing assembly 40 can further include a biasing member 70 engaging the first shoe 66 for biasing the first shoe 66 toward the second shoe 68. Specifically, the biasing member 70 continuously biases the first shoe 66 toward the second shoe 68. As such, the biasing member 70 assists in movably coupling the first shoe 66 to the first segment 44. Furthermore, the first segment 44 can define a hole 72 along the first axis 56, with the hole 72 disposed adjacent to the groove 52 such that the hole 72 and the groove 52 of the first segment 44 cooperate with each other to allow the first shoe 66 to bias through the hole 72 into the groove 52. The biasing member 70 assists in maintaining engagement between the finger 42 and the shoes 66, 68 as the second component 28 moves to the second position. The biasing member 70 can be a coil spring, a Belleville washer, a compression washer, or any suitable biasing member.

Continuing with FIGS. 4-6, the first shoe 66 can further include an outer periphery 74 having a lip 76 extending outwardly from the outer periphery 74. Additionally, the first segment 44 can define a recess 78 adjacent to the hole 72 such that the first segment 44 presents a shoulder 80, with the lip 76 of the first shoe 66 selectively engaging the shoulder 80. Therefore, engagement of the lip 76 and the shoulder 80 limit movement of the first shoe 66 toward the second shoe 68. It is to be appreciated that when the second shoe 68 is movable coupled to the second segment 46, the biasing member 70 can bias the second shoe 68, and additionally, the second segment 46 can define a hole along the first axis 56 and define a recess such that the second segment 46 presents a shoulder, and the second shoe 68 can include an outer periphery having a lip, with the lip of the second shoe 68 selectively engaging the shoulder of the second segment 46.

Referring back to FIGS. 3 and 4, the finger 42 generally extends outwardly away from the second component 28 to a distal end 82 and rotates about the pivot axis 30 with the second component 28. In certain embodiments, the finger 42 curves or arcs outwardly toward the distal end 82. Specifically, the finger 42 can include an attachment end 84 attached to the second component 28 to secure the finger 42 to the second component 28. Therefore, the finger 42 extends outwardly from the attachment end 84 to the distal end 82. More specifically, the finger 42 can be configured to curve or arc from the attachment end 84 to the distal end 82. Furthermore, the groove 52 of each of the first and second segments 44, 46 can be curved or arced to accommodate the configuration of the finger 42 (see FIG. 4). Therefore, generally, the groove 52 of the first and second segments 44, 46 are configured to cooperate with the configuration of the finger 42 such that the finger 42 can move into and out of the pocket 54.

The distal end 82 is inserted through the pocket 54 of the first and second segments 44, 46 as the second component 28 moves to the second position. Therefore, as shown in FIG. 6, the distal end 82 can be disposed outside of the pocket 54 when the second component 28 is in the second position. It is to be appreciated that the distal end 82 can be disposed inside the pocket 54 when the second component 28 is in the second position. As such, the finger 42 can be inserted into the pocket 54 any suitable distance to dampen movement of the trunk lid 20 relative to the mounting shelf 18. It is to also be appreciated that the finger 42 can be referred to as a blade.

Figure 7:
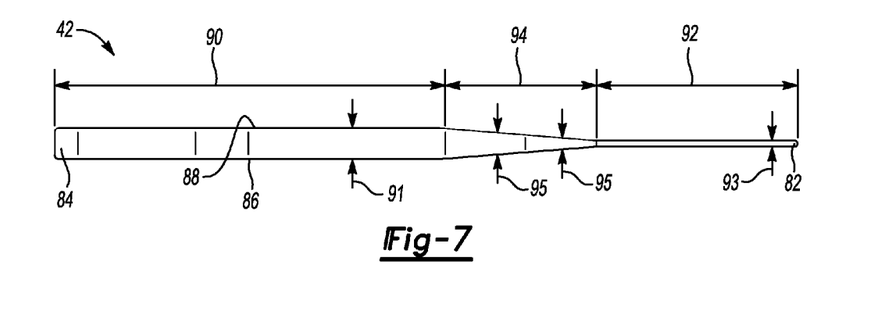
FIG. 7 is a schematic side view of the finger.

Referring to FIGS. 4 and 7, furthermore, the finger 42 can include a first side 86 and a second side 88 opposing each other. Generally, one of the first and second sides 86, 88 slidingly engages the first shoe 66 when the second component 28 moves to the second position. For example, the first side 86 can face the first shoe 66 and the second side 88 can face the second shoe 68 when the second component 28 is in the second position. Therefore, as shown in FIG. 6, the first side 86 of the finger 42 slidingly engages the first shoe 66 when the second component 28 moves to the second position and the second side 88 of the finger 42 slidingly engages the second shoe 68 when the second component 28 moves to the second position. As such, the finger 42 slidingly engaging the housing assembly 40 can be further defined as the first side 86 of the finger 42 slidingly engaging the first shoe 66 and the second side 88 of the finger 42 slidingly engaging the second shoe 68.

Generally, the finger 42 can be tapered to dampen movement of the trunk lid 20 as the second component 28 moves to the second position. In other words, sliding engagement of the finger 42 with one or more of the shoes 66, 68 dampens movement of the trunk lid 20. Generally, the thickness of the finger 42 increases as the finger 42 is inserted into the pocket 54 which increases the frictional engagement between the shoes 66, 68 and the finger 42 to slow down or dampen movement of the second component 28 which in turn slows down or dampens movement of the trunk lid 20.

As best shown in FIG. 7, the finger 42 can further include a first section 90 having a first thickness 91 and a second section 92 spaced from the first section 90 and defining the distal end 82. In other words, the second section 92 includes the distal end 82. The second section 92 has a second thickness 93 less than the first thickness 91. Additionally, the finger 42 can include a transition section 94 disposed between the first and second sections 90, 92. The transition section 94 has a variable thickness 95 changing thickness between the first and second sections 90, 92 such that the variable thickness 95 is less than the first thickness 91 and greater than the second thickness 93. For example, the variable thickness 95 of the transition section 94 can decrease in thickness from the first section 90 toward the second section 92 such that the first and second sides 86, 88 of the finger 42 taper toward each other as the first and second sides 86, 88 extend toward the distal end 82. The configuration of the finger 42 can be adjusted to obtain the desired amount of dampening. For example, the transition section 94 can present flat first and second sides 86, 88 (see FIG. 7) that taper toward each other as the sides 86, 88 extend toward the distal end 82. Alternatively or in addition to the flat sides 86, 88, the transition section 94 can present curved, arced or arcuate first and second sides 86, 88, i.e., the sides 86, 88 can curve outwardly away from each other. It is to be appreciated that the configuration of the finger 42 also compensates for tolerance issues between the housing assembly 40 and the second component 28. In other words, the finger 42 having different thicknesses in different sections 90, 92, 94 allows the finger 42 to compensate for various tolerance differences between the housing assembly 40 and the second component 28.

For example, the second section 92 of the finger 42 can be disposed in the pocket 54 without engaging the shoes 66, 68 if the shoes 66, 68 are spaced from each other a distance greater than the second thickness 93. As the finger 42 continues to be inserted through the pocket 54, the transition section 94 begins to engage the shoes 66, 68 and dampen movement of the second component 28 during movement to the second position. The variable thickness 95 of the transition section 94 increases as the finger 42 continues to move through the pocket 54 which increases a force applied to the finger 42 by the shoes 66, 68; and this frictional engagement causes movement of the finger 42 to slow down and continue to dampen or slow down movement of the second component 28, and thus, the trunk lid 20. When the first section 90 of the finger 42 engages the shoes 66, 68, again, the frictional engagement between the finger 42 and the shoes 66, 68 causes movement of the finger 42 to slow down and continue to dampen or slow down movement of the second component 28, and thus, the trunk lid 20. Travel of the second component 28 to the second position can end when there is frictional engagement between the transition section 94 and the shoes 66, 68 or when there is frictional engagement between the first section 90 and the shoes 66, 68. Therefore, when travel of the second component 28 to the second position ends, the trunk lid 20 is open.

Referring to FIGS. 3-6, generally, the damper device 38 can also include an elastic band 96 surrounding the housing assembly 40 such that the elastic band 96 continuously biases the second segment 46 toward the first segment 44. Simply stated, the elastic band 96 continuously biases the first and second segments 44, 46 toward each other. Therefore, depending on which of the first and/or second segments 44, 46 are movable relative to the first component 26, the elastic band 96 will continuously bias the movable segment(s) 44, 46 toward each other. It is to be appreciated that the elastic band 96 can be any suitable configuration and can be configurations other than a band.

Generally, the elastic band 96 can be formed of an elastomer. One suitable elastomer is rubber. In other words, the elastic band 96 is formed of a biasable material such that the band is elastically deformable. Therefore, the elastic band 96 can stretch and contract as the finger 42 moves through the pocket 54 of the housing assembly 40. Simply stated, the elastic band 96 can bias to stretch when the finger 42 and the second component 28 are in the second position, and contract back to its original position when the finger 42 and the second component 28 are in the first position. It is to be appreciated that the elastic band 96 can be formed of any suitable elastomer or material(s) having elastic properties.

Furthermore, continuing with FIGS. 3-6, the first component 26 can include a leg 98 extending outwardly toward the housing assembly 40. In one embodiment, the first segment 44 of the housing assembly 40 is affixed to the leg 98, and in this embodiment, the second segment 46 is movable relative to the first segment 44. In another embodiment, the second segment 46 of the housing assembly 40 is affixed to the leg 98, and in this embodiment, the first segment 44 is moveable relative to the second segment 46. The elastic band 96 surrounds the first and second segments 44, 46 and the leg 98. Specifically, the leg 98 can have a front side 100 and a back side 102 opposing each other along the first axis 56, with the elastic band 96 engaging the back side 102 of the leg 98 and the outer side 50 of the second segment 46. Therefore, the elastic band 96 maintains the orientation of the second segment 46 relative to the first segment 44 or the orientation of the first segment 44 relative to the second segment 46. Furthermore, the elastic band 96 can maintain the orientation of the first and second segments 46, 48 relative to each other when both of the first and second segments 46, 48 are movable. In addition, the biasing member 70 is disposed between the front side 100 of the leg 98 and the first shoe 66. For example, the biasing member 70 engages the front side 100 of the leg 98 and the back of the first shoe 66 (see FIGS. 5 and 6). As another example, when the second shoe 68 is biasable, the biasing member 70 engages the front side 100 of the leg 98 and the back of the second shoe 68. It is to be appreciated that the leg 98 can be affixed to the first component 26 or integrally formed with the first component 26 as one-piece. It is to also be appreciated that the leg 98 can be any suitable configuration for affixing one or both of the segments 44, 46 thereto. For example, the first and second segments 44, 46 can each be affixed to the leg 98, or each of the segments 44, 46 can be affixed to respective legs 98 such that the legs 98 act as a leaf spring to bias the segments 44, 46 back and forth in response to the finger 42 moving into and out of the pocket 54. When the segments 44, 46 are affixed to respective legs 98 such that the legs 98 are acting as the leaf spring, the elastic band 96 can be eliminated.

Optionally, at least one of the leg 98, the first segment 44 and the second segment 46 can include a flange 104 (see FIGS. 3 and 4) for preventing transverse movement of the elastic band 96 relative to the first axis 56. Therefore, one edge of the elastic band 96 can abut the flange 104 to maintain the position of the elastic band 96 about the first and second segments 44, 46 and the leg 98. In other words, the flange 104 prevents the elastic band 96 from slipping off of the housing assembly 40.

It is to be appreciated that the hinge assembly 12 can include other features not discussed in detail herein. For example, the hinge assembly 12 can also include a second biasing member 106 (see FIGS. 1 and 2) attached to the second component 28 between the first and second end portions 32, 34 to continuously bias the second component 28 toward the second position. Only a portion of the second biasing member 106 is shown in FIGS. 1 and 2 for illustrative purposes and it is to be appreciated that the second biasing member 106 can also be attached to the vehicle 10, such as one of the side walls of the storage compartment 14. Therefore, when a latch disengages from the trunk lid 20, the trunk lid 20 can rotate about the pivot axis 30 by the second biasing member 106 biasing the trunk lid 20 up to open the storage compartment 14.

As indicated above, numerous modifications of the first and second segments 44, 46 and the shoes 66, 68 can be obtained. A brief discussion of the different variations are recapped here. For example, when the first segment 44 is fixed to the first component 26, the second segment 46 can be fixed to the first component 26 or movable relative to the first segment 44, and additionally in this embodiment, the first shoe 66 can be fixed to the first segment 44 or movable relative to the first segment 44, and similarly, the second shoe 68 can be fixed to the second segment 46 or movable relative to the second segment 46. As another example, when the first segment 44 is movable relative to the second segment 46, the second segment 46 can be fixed to the first component 26 or movable relative to the first segment 44, and additionally in this embodiment, the first shoe 66 can be fixed to the first segment 44 or movable relative to the first segment 44, and similarly, the second shoe 68 can be fixed to the second segment 46 or movable relative to the second segment 46. As yet another example, when both of the first and second segments 44, 46 are fixed to respective legs 98, the legs 98 can be spaced from each other and the legs 98 can be biasable to allow the first and second segments 44, 46 to move back and forth, and additionally in this embodiment, the first shoe 66 can be fixed to the first segment 44 or movable relative to the first segment 44, and similarly, the second shoe 68 can be fixed to the second segment 46 or movable relative to the second segment 46. As yet another example, when both of the first and second segments 44, 46 are fixed to respective legs 98, or the first component 26, the legs 98/the first component 26 can be fixed, i.e., does not bias relative to each other, and in this embodiment, one or both of the shoes 66, 68 can be movable relative to respective first and second segments 44, 46.

For illustrative purposes only, the opening of the storage compartment 14 will be discussed below to clarify the operation of the hinge assembly 12 dampening movement of the trunk lid 20. Therefore, initially, the storage compartment 14 is closed and the second component 28 is in the first position such that the finger 42 is spaced from the pocket 54 of the housing assembly 40. Only one embodiment of hinge assembly 12 is discussed below but it is to be appreciated that the same general principles of applying friction to the finger 42 to dampen movement of the trunk lid 20 apply to all of the embodiments discussed herein. Therefore, for the below discussion, the first segment 44 is affixed to the first component 26, the second segment 46 is movable relative to the first segment 44, the first shoe 66 is movable relative to the first segment 44 and the second shoe 68 is affixed to the second segment 46.

When the user desires to open the storage compartment 14, the user disengages the latch from the trunk lid 20. Once the latch is disengaged, the second component 28 rotates about the pivot axis 30 from the first position toward the second position and the finger 42 correspondingly rotates about the pivot axis 30. Rotation of the second component 28 causes rotation of the trunk lid 20 about the pivot axis 30. As the second component 28 rotates toward the second position, the finger 42 moves toward the housing assembly 40. Specifically, the distal end 82 or the second section 92 of the finger 42 begins to move through the pocket 54 of the first and second segments 44, 46. Generally, the distal end 82/second section 92 guides the finger 42 into the pocket 54 and does not engage the shoes 66, 68. As the finger 42 continues to move through the pocket 54, the transition section 94 enters the pocket 54. The transition section 94 widens toward the first section 90, and thus, as the finger 42 continues to move through the pocket 54, the transition section 94 slidingly engages the housing assembly 40, and more specifically, slidingly engages the shoes 66, 68. Frictional engagement between the transition section 94 and the shoes 66, 68 begin to dampen the movement of the finger 42 and the second component 28, which, in turn, dampens movement of the trunk lid 20 relative to the mounting shelf 18 or the first component 26. Specifically, the shoes 66, 68 apply a force to the transition section 94 which slows down movement of the finger 42 relative to the housing assembly 40, and thus dampens movement of the trunk lid 20 relative to the mounting shelf 18. In other words, frictional engagement occurs between the shoes 66, 68 and the finger 42 to dampen movement.

The biasing member 70 continuously biases the first shoe 66 toward the second shoe 68 such that the shoes 66, 68 frictionally engage the finger 42 as the transition section 94 continues to move through the pocket 54. Specifically, the first side 86 of the finger 42 slidingly engages the first shoe 66 along the transition section 94 and the second side 88 of the finger 42 slidingly engages the second shoe 68 along the transition section 94 to dampen movement of the trunk lid 20. As the transition section 94 moves through the pocket 54, the transition section 94 widens to apply a force to the first shoe 66 which can overcome the biasing force applied by the biasing member 70, and once the biasing force is overcome, the first shoe 66 moves along the first axis 56 toward the leg 98 and at least partially out of the pocket 54. As such, the lip 76 of the first shoe 66 moves away from the shoulder 80 of the first segment 44 as the first shoe 66 at least partially moves out of the pocket 54.

Furthermore, during travel of the transition section 94 through the pocket 54, the second segment 46 can move along the first axis 56 away from the first segment 44 when the biasing force applied by the elastic band 96 is overcome. Therefore, the first and second segments 44, 46 can separate from each other when the biasing force applied by the elastic band 96 is overcome (see FIG. 6). When the biasing force of the elastic band 96 is overcome, the second segment 46 moves away from the first segment 44 along the first and second guides 60, 64 and the elastic band 96 stretches.

The biasing member 70 and the elastic band 96 apply forces to the finger 42 to reduce the movement of the finger 42 relative to the housing assembly 40 which in turn reduces movement of the second component 28 and the trunk lid 20 relative to the first component 26 and the mounting shelf 18. In other words, the biasing member 70 and the elastic band 96 apply forces to the finger 42 to reduce the energy produced as the trunk lid 20 is opened. Simply stated, the biasing member 70 and the elastic band 96 apply forces to the finger 42 to dampen or slow down the opening of the trunk lid 20. Slowing down the opening of the trunk lid 20 prevents the trunk lid 20 from bobbling back and forth when the trunk lid 20 reaches the end of travel to come to rest open. It is to be appreciated that the trunk lid 20 can reach the end of travel along the transition section 94 or the first section 90 of the finger 42. When the first section 90 enters the pocket 54, the first side 86 of the finger 42 slidingly engages the first shoe 66 along the first section 90 and the second side 88 of the finger 42 slidingly engages the second shoe 68 along the second section 92.

Once the trunk lid 20 is open, the second component 28 and the finger 42 are in the second position.

When the storage compartment 14 is to be closed, the trunk lid 20 is rotated about the pivot axis 30 back toward the latch. As the trunk lid 20 rotates, the second component 28 rotates from the second position back to the first position. The finger 42 moves back through the pocket 54 away from the housing assembly 40 and disengages the shoes 66, 68. As such, the first shoe 66 biases back into the pocket 54 such that the lip 76 engages the shoulder 80 of the first segment 44. Furthermore, the elastic band 96 contracts and biases the second segment 46 back into engagement with the first segment 44.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A hinge assembly for a storage compartment of a vehicle, the hinge assembly comprising:
   a first component;
   a second component coupled to the first component and movable between a first position and a second position relative to the first component; and
   a damper device including a housing assembly supported by the first component and a finger attached to the second component such that the finger is movable with the second component between the first and second positions, with the finger and the housing assembly spaced from each other when the second component is in the first position, and the finger slidingly engages the housing assembly as the second component moves to the second position such that frictional engagement between the finger and the housing assembly dampens movement of the second component relative to the first component;
   wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger;
   the first and second segments each define a first aperture generally aligning with each other, and wherein the housing assembly further includes a first guide disposed in the first aperture of the first and second segments for maintaining alignment of the first and second segments as the second segment moves relative to the first segment in response to movement of the finger into and out of the pocket.

2. An assembly as set forth in claim 1 wherein the housing assembly includes a first shoe coupled to one of the first and second segments of the housing assembly and at least partially disposed in the pocket such that the finger slidingly engages the first shoe as the finger moves through the pocket when the second component moves to the second position.

3. An assembly as set forth in claim 2 wherein the finger extends outwardly away from the second component to a distal end, with the distal end inserted through the pocket as the second component moves to the second position; and wherein the finger includes a first side and a second side opposing each other, with one of the first and second sides slidingly engaging the first shoe when the second component moves to the second position.

4. An assembly as set forth in claim 3 wherein the finger includes a first section having a first thickness and a second section spaced from the first section and defining the distal end, with the second section having a second thickness less than the first thickness, and wherein the finger includes a transition section disposed between the first and second sections and having a variable thickness changing thickness between the first and second sections such that the variable thickness is less than the first thickness and greater than the second thickness.

5. An assembly as set forth in claim 4 wherein the variable thickness of the transition section decreases in thickness from the first section toward the second section such that the first and second sides of the finger taper toward each other as the first and second sides extend toward the distal end.

6. An assembly as set forth in claim 2 wherein the housing assembly includes a second shoe coupled to one of the first and second segments of the housing assembly, with the first and second shoes spaced from and generally aligning with each other along a first axis, with the finger slidingly engaging the first and second shoes when the second component moves to the second position.

7. An assembly as set forth in claim 6 wherein at least one of the first and second shoes are affixed to one of the first and second segments of the housing assembly.

8. An assembly as set forth in claim 7 wherein the first shoe is movably coupled to the first segment and the second shoe is affixed to the second segment, with the finger including a first side slidingly engaging the first shoe when the second component moves to the second position and the finger includes a second side opposing the first side and slidingly engaging the second shoe when the second component moves to the second position.

9. An assembly as set forth in claim 6 wherein the housing assembly includes a biasing member engaging the first shoe for biasing the first shoe toward the second shoe.

10. An assembly as set forth in claim 9 wherein the first segment defines a hole along the first axis, with the hole disposed adjacent to the groove such that the hole and the groove of the first segment cooperate with each other to allow the first shoe to bias through the hole into the groove.

11. An assembly as set forth in claim 10 wherein the first shoe includes an outer periphery having a lip extending outwardly from the outer periphery, and wherein the first segment defines a recess adjacent to the hole such that the first segment presents a shoulder, with the lip of the first shoe selectively engaging the shoulder.

12. An assembly as set forth in claim 1 wherein at least one of the first and second segments are affixed to the first component.

13. An assembly as set forth in claim 12 wherein the first segment is affixed to the first component and the second segment is movable relative to the first segment along a first axis.

14. An assembly as set forth in claim 13 wherein the damper device includes an elastic band surrounding the housing assembly such that the elastic band continuously biases the second segment toward the first segment.

15. An assembly as set forth in claim 14 wherein the first component includes a leg extending outwardly toward the housing assembly, with the first segment of the housing assembly affixed to the leg and the elastic band surrounding the first and second segments and the leg.

16. An assembly as set forth in claim 15 wherein the leg has a front side and a back side opposing each other along the first axis, with the elastic band engaging the back side of the leg and the outer side of the second segment.

17. An assembly as set forth in claim 1 wherein the first and second segments each define a second aperture generally aligning with each other and spaced from the first aperture of the first and second segments, and wherein the housing assembly further includes a second guide disposed in the second aperture of the first and second segments for maintaining alignment of the first and second segments as the second segment moves relative to the first segment in response to movement of the finger into and out of the pocket.

18. A vehicle comprising:
  a storage compartment including a mounting shelf and a trunk lid movable relative to the mounting shelf to open and close the storage compartment;
  a hinge assembly coupled to the mounting shelf and the trunk lid for supporting the trunk lid when opening and closing the storage compartment, with the hinge assembly comprising:
    a first component attached to the mounting shelf;
    a second component coupled to the first component and attached to the trunk lid, with the second component movable between a first position and a second position relative to the first component; and
    a damper device including a housing assembly supported by the first component and a finger attached to the second component such that the finger is movable with the second component between the first and second positions, with the finger and the housing assembly spaced from each other when the second component is in the first position, and the finger slidingly engages the housing assembly as the second component moves to the second position such that frictional engagement between the finger and the housing assembly dampens movement of the trunk lid relative to the mounting shelf.

19. A vehicle as set forth in claim 18 wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger.

20. A vehicle as set forth in claim 19 wherein the housing assembly includes a first shoe coupled to one of the first and second segments of the housing assembly and at least partially disposed in the pocket such that the finger slidingly engages the first shoe as the finger moves through the pocket when the second component moves to the second position.

21. A vehicle as set forth in claim 20 wherein the finger includes a first side and a second side opposing each other, with one of the first and second sides slidingly engaging the first shoe when the second component moves to the second position.

22. A vehicle as set forth in claim 19 wherein the finger extends outwardly away from the second component to a distal end, with the distal end inserted through the pocket as the second component moves to the second position; and wherein the finger includes a first section having a first thickness and a second section spaced from the first section and defining the distal end, with the second section having a second thickness less than the first thickness, and wherein the finger includes a transition section disposed between the first and second sections and having a variable thickness changing thickness between the first and second sections.

23. A vehicle as set forth in claim 22 wherein the variable thickness is less than the first thickness and greater than the second thickness.

24. A vehicle as set forth in claim 23 wherein the variable thickness of the transition section decreases in thickness from the first section toward the second section such that the first and second sides of the finger taper toward each other as the first and second sides extend toward the distal end.

25. A vehicle as set forth in claim 20 wherein the housing assembly includes a second shoe coupled to one of the first and second segments of the housing assembly, with the first and second shoes spaced from and generally aligning with each other along a first axis, with the finger slidingly engaging the first and second shoes when the second component moves to the second position.

26. A vehicle as set forth in claim 25 wherein at least one of the first and second shoes are affixed to one of the first and second segments of the housing assembly.

27. A vehicle as set forth in claim 26 wherein the first shoe is movably coupled to the first segment and the second shoe is affixed to the second segment, with the finger including a first side slidingly engaging the first shoe when the second component moves to the second position and the finger includes a second side opposing the first side and slidingly engaging the second shoe when the second component moves to the second position.

28. A vehicle as set forth in claim 25 wherein the housing assembly includes a biasing member engaging the first shoe for biasing the first shoe toward the second shoe.

29. A vehicle as set forth in claim 28 wherein the first segment defines a hole along the first axis, with the hole disposed adjacent to the groove such that the hole and the groove of the first segment cooperate with each other to allow the first shoe to bias through the hole into the groove.

30. A vehicle as set forth in claim 29 wherein the first shoe includes an outer periphery having a lip extending outwardly from the outer periphery, and wherein the first segment defines a recess adjacent to the hole such that the first segment presents a shoulder, with the lip of the first shoe selectively engaging the shoulder.

31. A vehicle as set forth in claim 19 wherein at least one of the first and second segments are affixed to the first component.

32. A vehicle as set forth in claim 31 wherein the first segment is affixed to the first component and the second segment is movable relative to the first segment along a first axis.

33. A vehicle as set forth in claim 32 wherein the damper device includes an elastic band surrounding the housing assembly such that the elastic band continuously biases the second segment toward the first segment.

34. A vehicle as set forth in claim 33 wherein the first component includes a leg extending outwardly toward the housing assembly, with the first segment of the housing assembly affixed to the leg and the elastic band surrounding the first and second segments and the leg.

35. A vehicle as set forth in claim 34 wherein the leg has a front side and a back side opposing each other along the first axis, with the elastic band engaging the back side of the leg and the outer side of the second segment.

36. A vehicle as set forth in claim 19 wherein the first and second segments each define a first aperture generally aligning with each other, and wherein the housing assembly further includes a first guide disposed in the first aperture of the first and second segments for maintaining alignment of the first and second segments as the second segment moves relative to the first segment in response to movement of the finger into and out of the pocket.

37. A vehicle as set forth in claim 36 wherein the first and second segments each define a second aperture generally aligning with each other and spaced from the first aperture of the first and second segments, and wherein the housing assembly further includes a second guide disposed in the second aperture of the first and second segments for maintaining alignment of the first and second segments as the second segment moves relative to the first segment in response to movement of the finger into and out of the pocket.

38. A hinge assembly for a storage compartment of a vehicle, the hinge assembly comprising:
   a first component;
   a second component coupled to the first component and movable between a first position and a second position relative to the first component; and
   a damper device including a housing assembly supported by the first component and a finger attached to the second component such that the finger is movable with the second component between the first and second positions, with the finger and the housing assembly spaced from each other when the second component is in the first position, and the finger slidingly engages the housing assembly as the second component moves to the second position such that frictional engagement between the finger and the housing assembly dampens movement of the second component relative to the first component;
   wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger;
   wherein the housing assembly includes a first shoe coupled to one of the first and second segments of the housing assembly and at least partially disposed in the pocket such that the finger slidingly engages the first shoe as the finger moves through the pocket when the second component moves to the second position;
   wherein the finger extends outwardly away from the second component to a distal end, with the distal end inserted through the pocket as the second component moves to the second position; and wherein the finger includes a first side and a second side opposing each other, with one of the first and second sides slidingly engaging the first shoe when the second component moves to the second position;
   the finger includes a first section having a first thickness and a second section spaced from the first section and defining the distal end, with the second section having a second thickness less than the first thickness, and wherein the finger includes a transition section disposed between the first and second sections and having a variable thickness changing thickness between the first and second sections such that the variable thickness is less than the first thickness and greater than the second thickness.

39. An assembly as set forth in claim 38 wherein the variable thickness of the transition section decreases in thickness from the first section toward the second section such that the first and second sides of the finger taper toward each other as the first and second sides extend toward the distal end.

40. A hinge assembly for a storage compartment of a vehicle, the hinge assembly comprising:
   a first component;
   a second component coupled to the first component and movable between a first position and a second position relative to the first component; and
   a damper device including a housing assembly supported by the first component and a finger attached to the second component such that the finger is movable with the second component between the first and second positions, with the finger and the housing assembly spaced from each other when the second component is in the first position, and the finger slidingly engages the housing assembly as the second component moves to the second position such that frictional engagement between the finger and the housing assembly dampens movement of the second component relative to the first component;
   wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger;
   wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger;
   wherein the housing assembly includes a first shoe coupled to one of the first and second segments of the housing assembly and at least partially disposed in the pocket such that the finger slidingly engages the first shoe as the finger moves through the pocket when the second component moves to the second position;
   wherein the housing assembly includes a second shoe coupled to one of the first and second segments of the housing assembly, with the first and second shoes spaced from and generally aligning with each other along a first axis, with the finger slidingly engaging the first and second shoes when the second component moves to the second position;
   wherein the housing assembly includes a biasing member engaging the first shoe for biasing the first shoe toward the second shoe.

41. An assembly as set forth in claim 40 wherein the first segment defines a hole along the first axis, with the hole disposed adjacent to the groove such that the hole and the groove of the first segment cooperate with each other to allow the first shoe to bias through the hole into the groove.

42. An assembly as set forth in claim 41 wherein the first shoe includes an outer periphery having a lip extending outwardly from the outer periphery, and wherein the first segment defines a recess adjacent to the hole such that the first segment presents a shoulder, with the lip of the first shoe selectively engaging the shoulder.

43. A hinge assembly for a storage compartment of a vehicle, the hinge assembly comprising:
   a first component;
   a second component coupled to the first component and movable between a first position and a second position relative to the first component; and
   a damper device including a housing assembly supported by the first component and a finger attached to the second component such that the finger is movable with the second component between the first and second positions, with the finger and the housing assembly spaced from each other when the second component is in the first position, and the finger slidingly engages the housing assembly as the second component moves to the second position such that frictional engagement between the finger and the housing assembly dampens movement of the second component relative to the first component;
   wherein the housing assembly includes a first segment and a second segment cooperating with each other and each having an inner side facing each other and an outer side opposing the inner side of the respective first and second segments, with the inner side of each of the first and second segments defining a groove cooperating with each other to present a pocket for receiving the finger;
   wherein the first segment is affixed to the first component and the second segment is movable relative to the first segment along a first axis.

44. An assembly as set forth in claim 43 wherein the damper device includes an elastic band surrounding the housing assembly such that the elastic band continuously biases the second segment toward the first segment.

45. An assembly as set forth in claim 44 wherein the first component includes a leg extending outwardly toward the housing assembly, with the first segment of the housing assembly affixed to the leg and the elastic band surrounding the first and second segments and the leg.

46. An assembly as set forth in claim 45 wherein the leg has a front side and a back side opposing each other along the first axis, with the elastic band engaging the back side of the leg and the outer side of the second segment.

* * * * *